(12) United States Patent
Nishi

(10) Patent No.: US 11,409,773 B2
(45) Date of Patent: Aug. 9, 2022

(54) SELECTION DEVICE, SELECTION METHOD, AND NON-TRANSITORY COMPUTER READABLE STORAGE MEDIUM

(71) Applicant: Yahoo Japan Corporation, Tokyo (JP)

(72) Inventor: Kentaro Nishi, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 746 days.

(21) Appl. No.: 16/129,692

(22) Filed: Sep. 12, 2018

(65) Prior Publication Data
US 2019/0087485 A1 Mar. 21, 2019

(30) Foreign Application Priority Data
Sep. 20, 2017 (JP) .............................. JP2017-180129

(51) Int. Cl.
| | | |
|---|---|---|
| *G06F 16/20* | (2019.01) | |
| *G06F 16/90* | (2019.01) | |
| *G06N 20/00* | (2019.01) | |
| *G06F 16/28* | (2019.01) | |
| *G06F 16/951* | (2019.01) | |

(52) U.S. Cl.
CPC .......... *G06F 16/288* (2019.01); *G06F 16/285* (2019.01); *G06F 16/951* (2019.01); *G06N 20/00* (2019.01)

(58) Field of Classification Search
CPC ..... G06F 16/288; G06F 16/285; G06F 16/951
See application file for complete search history.

(56) References Cited

U.S. PATENT DOCUMENTS

| | | | |
|---|---|---|---|
| 10,198,491 B1* | 2/2019 | Semturs | G06F 16/951 |
| 2011/0022550 A1* | 1/2011 | Pennacchiotti | G06N 20/00 706/12 |
| 2017/0083628 A1* | 3/2017 | Frenkel | G06Q 30/0251 |
| 2018/0150559 A1* | 5/2018 | Ahuja | G06F 16/951 |
| 2019/0012347 A1* | 1/2019 | Fukui | G06F 16/285 |

FOREIGN PATENT DOCUMENTS

| | | |
|---|---|---|
| JP | 2007-011775 A | 1/2007 |
| JP | 2013225181 A | 10/2013 |
| JP | 2016-139216 A | 8/2016 |

(Continued)

OTHER PUBLICATIONS

Färber, M. et al. "On Emerging Entity Detection" European Knowledge Acquisition Workshop; 15 pages.

(Continued)

*Primary Examiner* — Kristopher Andersen
(74) *Attorney, Agent, or Firm* — Procopio, Cory, Hargreaves & Savitch LLP

(57) ABSTRACT

A selection device includes an identification unit that identifies search histories related to element candidates that are candidates for a new element, and pieces of posted information on the element candidates. The selection device includes a selection unit that selects, from among the element candidates, an element candidate in order to generate learning data to cause a model to learn a feature of information on the new element based on the identified search histories and the identified pieces of posted information.

16 Claims, 8 Drawing Sheets

(56) References Cited

FOREIGN PATENT DOCUMENTS

JP          6088091 B1    2/2017
JP          6097429 B     3/2017

OTHER PUBLICATIONS

Office Action for related JP App No. 2017-180129 dated Feb. 5, 2019, 7 pgs.
Akasaki et al., Discovering Emerging Entity by Capturing Emergence and Prevalent Process, Internet<URL:http://db /event.jpn.org/deim2017/papers/303.pdf of the unknown entity, a forum relating to ninth data engineering and information management (fifteenth annual competition of the Japan database society of the Japan) [online] DEIM 2017 Japan Institute of Electronics, Information and Technology, Technical Agency, Japan Database System Research nstitute, Feb. 27, 2017, Japan Database System Research Institute, Feb. 27, 2017, Japan Database System Research Institute, Japan (31 pages).
Office Action for related Japanese Patent Application No. 2019-072876 dated Apr. 27, 2021 (12 pages).

\* cited by examiner

| ENTITY ID | ENTITY TYPE | NODE ID | NODE TYPE | DATA | ... |
|---|---|---|---|---|---|
| E11 | PERSON | I111 | NAME | NAME #1 | ... |
| | | I112 | PHOTO | PHOTO #1 | ... |
| | | I113 | DATE OF BIRTH | DATE OF BIRTH #1 | ... |
| | | ... | ... | ... | ... |
| E12 | PERSON | I121 | NAME | NAME #1 | ... |
| | | ... | ... | ... | ... |
| E21 | OCCUPATION | I211 | NAME OF OCCUPATION | ACTOR/ACTRESS | ... |
| | | ... | ... | ... | ... |
| E22 | OCCUPATION | I221 | NAME OF OCCUPATION | WRITER | ... |
| | | ... | ... | ... | ... |
| ... | ... | ... | ... | ... | ... |

| TRIPLE ID | RELATIONAL INFORMATION ID | TYPE | FIRST ELEMENT | SECOND ELEMENT |
|---|---|---|---|---|
| TRIPLE #1 | C1 | OCCUPATION | E11 | E21 |
| TRIPLE #2 | C2 | OCCUPATION | E11 | E22 |
| ... | ... | ... | ... | ... |

| SEARCH LOG ID | SEARCH QUERY | SEARCHED TIME/DATE | ... |
|---|---|---|---|
| SEARCH LOG #1 | SEARCH QUERY #1 | SEARCHED TIME/DATE #1 | ... |
| SEARCH LOG #2 | SEARCH QUERY #2 | SEARCHED TIME/DATE #2 | ... |
| ... | ... | ... | ... |

| POST LOG ID | POSTED INFORMATION | POSTED TIME/DATE | ... |
|---|---|---|---|
| POST LOG ID #1 | POSTED INFORMATION #1 | POSTED TIME/DATE #1 | ... |
| POST LOG ID #2 | POSTED INFORMATION #2 | POSTED TIME/DATE #2 | ... |
| ... | ... | ... | ... |

SELECTION DEVICE, SELECTION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2017-180129 filed in Japan on Sep. 20, 2017.

BACKGROUND

1. Field

Example implementations relate to a selection device, a selection method, a selection program (e.g., a non-transitory computer readable storage medium), a model, and learning data.

2. Related Art

A related art technique includes a knowledge base in which concepts of persons, events, and the like are set as entities, and relations between the entities are structuralized. Also, there is a related art technique in which the entities are subject to clustering to efficiently create such a knowledge database and the relations between the entities are updated based on a clustering result.
Patent Literature 1: Japanese Patent No. 6088091
Non Patent Literature 1: "On Emerging Entity Detection" Michael Farber, Achim Rettinger, Boulos El Asmar However, according to foregoing related art techniques, there may be a case where a new entity cannot be efficiently added.

For example, it may be possible to consider a method of extracting a new entity (hereinafter referred to as "newly appeared entity") from contents, such as news articles, posted on the Internet. However, it is difficult to estimate the kind of newly appeared entity that is included in which content.

SUMMARY

It is an object of the example implementations to at least partially solve the problems in the related art technology.

According to one aspect of an example implementation, a selection device includes a control unit configured to identify search histories related to element candidates that are candidates for a new element, and pieces of posted information on the element candidates. The selection device includes a control unit that selects, from among the element candidates, an element candidate to generate learning data to cause a model to learn a feature of information on the new element based on the identified search histories and the identified pieces of posted information.

The above and other objects, features, advantages and technical and industrial significance of this inventive concept will be better understood by reading the following detailed description of presently example implementations, when considered in connection with the accompanying drawings.

BRIEF DESCRIPTION OF THE DRAWINGS

FIG. 3 is a diagram illustrating information registered in an entity database according to the example implementation;
FIG. 4 is a diagram illustrating information registered in a triple database according to the example implementation;
FIG. 5 is a diagram illustrating information registered in a search log database according to the example implementation;
FIG. 6 is a diagram illustrating information registered in a posted information database according to the example implementation.

DETAILED DESCRIPTION

In the following, a mode to implement a selection device, a selection method, a non-transitory computer readable storage medium (hereinafter referred to as an "embodiment" or "example implementation") according to the present application will be described in detail with reference to the drawings. Note that the selection device, selection method, non-transitory computer readable storage medium according to the present application are not limited by this example implementation. Additionally, note that, in each example implementation below, a same portion will be denoted by the same reference sign and repetition of the same description will be omitted.

Example Implementation

1. Processing Provided by Information Providing Device

Figure 1:
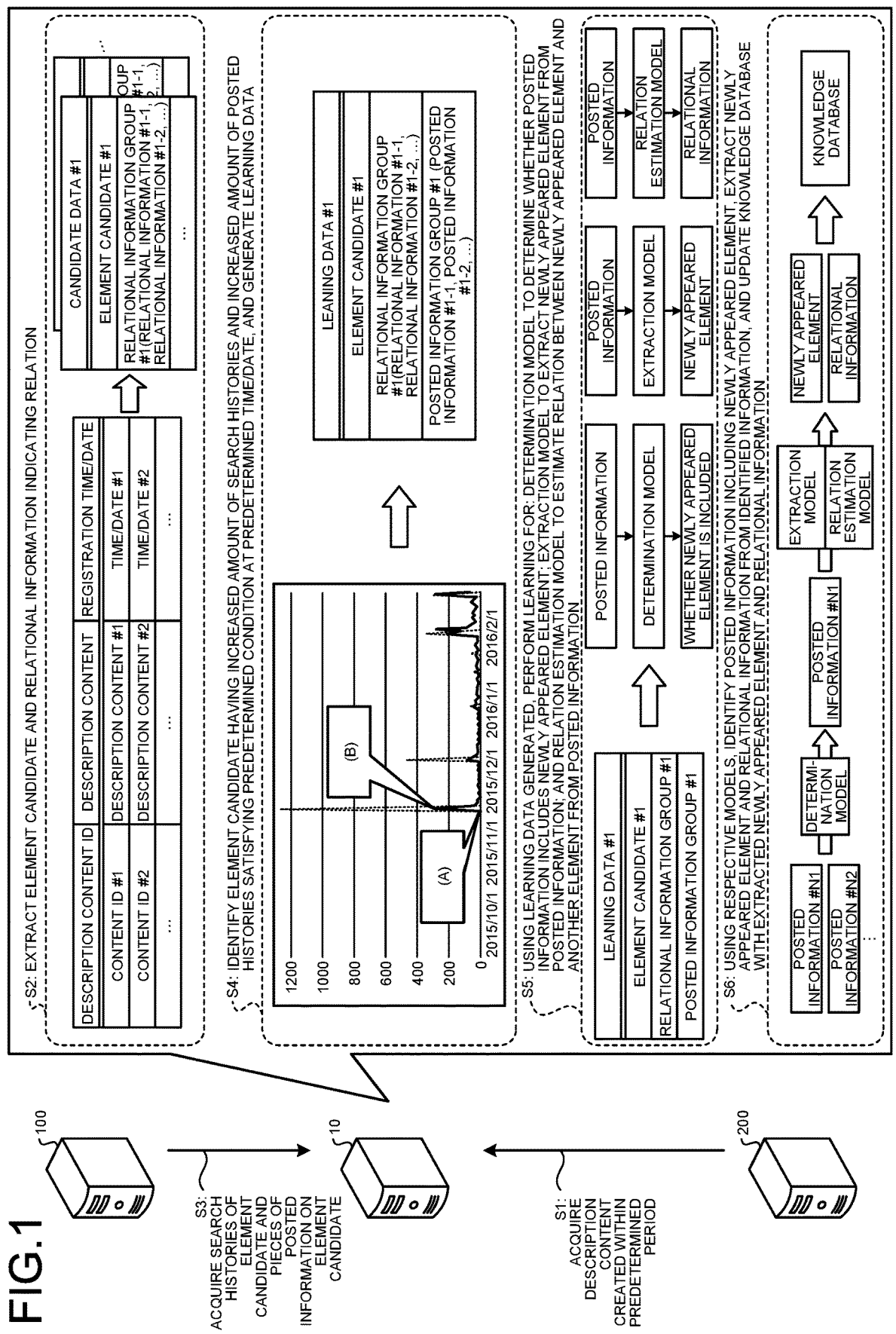
FIG. 1 is a diagram illustrating processing executed by an information providing device according to an example implementation.

First, example selection processing executed by an information providing device to be an exemplary selection device will be described with reference to FIG. 1. FIG. 1 is a diagram illustrating example processing executed by the information providing device according to the example implementation. In the following description, the processing is executed by an information providing device 10, as exemplary selection processing to select an entity to be a source of learning data, to create a model to detect a new entity to be registered in a knowledge database in which information obtained by systematizing and organizing knowledge is registered.

1-1. Outline of Information Providing Device

The information providing device 10 is an information processing device capable of communicating with a log server 100 and a description content server 200 via a (e.g., predetermined) network N such as the Internet (refer to FIG. 2, for example), and is implemented by a server device, a cloud system, or the like, for example. The information providing device 10 may also be capable of communicating with an arbitrary number of log servers 100 and an arbitrary number of description content servers 200 via the network N. Additionally, the information providing device 10 has a function of providing various kinds of information registered in the knowledge database on the basis of, for example, a request from a user terminal (not illustrated) used by a user.

For example, a user terminal transmits, to the information providing device 10, a search query to search the knowledge database. In this case, the information providing device 10 searches the knowledge database for information corresponding to the search query, and provides a search result to the user terminal.

The knowledge database searched by the information providing device 10 will be described. In the knowledge database, various kinds of knowledge are registered in a systematized and organized state. For example, in the knowledge database, an entity which is a registered element (hereinafter referred to as "element") and information indicating a relation between entities (hereinafter described as "relational information") are registered. The entity corresponds to a piece of information corresponding to each of various kinds of real-world content such as various kinds of things including but not limited to persons, objects, and buildings, which can be a subject, and attributes like occupations and nationalities, and various kinds of states and events. Furthermore, the relational information corresponds to a piece of information indicating a relation between two entities. Elements in the knowledge database included in the information providing device 10 (i.e., entities registered in the knowledge database) may correspond to arbitrary matters and events.

The log server 100 is an information processing device that holds various kinds of histories, and is implemented by a server device, a cloud system, or the like. For example, the log server 100 holds logs of search queries input by a user at the time of making various kinds of searches via the Internet. For example, the log server 100 holds logs of search queries in (e.g., arbitrary) searches such as a web search, a route search, a search for a transaction target in an electronic shopping street, a map search, and a content search.

Furthermore, the log server 100 holds pieces of posted information corresponding to various kinds of content posted on the Internet. For example, the log server 100 holds news, blogs, social networking service (SNS), and the like posted on websites. The log server 100 may also be implemented by a server device that distributes news, a server device that manages blogs, a server device that manages SNS, or the like.

The description content server 200 is an information processing device that manages and distributes description contents describing various kinds of elements such as persons, objects, buildings, contents, and events, and is implemented by a server device, a cloud system, or the like. For example, the description content server 200 manages and distributes description contents corresponding to contents describing various kinds of objects that can be elements in the knowledge database, such as Wikipedia (registered trademark) and a dictionary service via the Internet.

1-2. Selection Processing

Processing to register an element indicating a new matter in the knowledge database is considered. When a new element (hereinafter referred to as "newly appeared element") is registered in this knowledge database, not only a character string indicating the newly appeared element, but also relational information indicating the kind of relation that the newly appeared element has with another element, are required. To efficiently add such a newly appeared element and the relational information to the knowledge database, a method of extracting the newly appeared element from contents posted on the Internet, such as news articles, may be provided. However, it is difficult to determine what kind of newly appeared element is included in which content.

Therefore, the information providing device 10 executes selection processing as follows. First, the information providing device 10 identifies: search histories related to element candidates that are candidates for a new element; and pieces of posted information on the element candidates. Subsequently, based on the identified search histories and the identified pieces of posted information, the information providing device 10 selects, from among the element candidates, an element candidate to generate learning data, to cause a model to learn a feature of information on the new element.

For example, in a case of setting a certain word as an element candidate, a search state of the word can be estimated from search histories including the word. Also, a post state of the word can be estimated from posts including the word. The search state and post state can be indexes to determine whether the word indicates a newly appeared element. For example, in a case where the word indicates a newly appeared element, it can be considered that searching or posting for the word is suddenly made from a certain day. Therefore, the information providing device 10 selects an element candidate having a high possibility to be a newly appeared element, based on the search state indicated by search histories and the post state indicated by pieces of posted information.

For example, the information providing device 10 selects an element candidate to generate learning data based on the number of searches related to a certain element candidate indicated by the search histories and the number of pieces of posted information on the element candidate indicated by post histories. For example, the information providing device 10 selects an element candidate to generate learning data based on content indicating changes in the number of searches and content indicating changes in the number of posts. More specifically, the information providing device 10 selects, as the element candidate in order to generate learning data, an element candidate regarding which search is started to be generated from a certain day, and posting is started to be made from the same day.

Additionally, the information providing device 10 executes learning processing to perform learning for a model based on the element candidate selected by the selection processing. In other words, the information providing device 10 causes the model to learn a feature of information on a new element by using information on the selected element candidate. For example, the information providing device 10 generates, as the learning data, a set including the selected element candidate, pieces of posted information on the selected element candidate, and relational information indicating a relation between the selected element candidate and another element. Then, the information providing device 10 performs learning for the model by using the learning data.

More specifically, the information providing device 10 performs learning for a determination model to determine whether a piece of posted information is a post related to the new element by using the pieces of posted information on the selected element candidate. Additionally, the information providing device 10 performs learning for an element extraction model to extract a new element included in a piece of posted information by using the selected element candidate and the pieces of posted information on the selected element candidate. Additionally, the information providing device 10 performs learning for a relation estimation model to extract pieces of relational information each indicating a relation between the new element and another element included in a piece of posted information by using the pieces of posted information on the selected element candidate and each relation between the selected element candidate and another element. For example, the information providing device 10 performs learning for a plurality of models that extracts, from the pieces of posted information, another element having a (e.g., predetermined) relation with a newly appeared element, that is, learning for the plurality of models each extracting another element having a different relation.

Furthermore, the information providing device 10 performs update processing in which the newly appeared element and pieces of relational information are extracted from the pieces of posted information by using the models subjected to learning by the learning processing, and the knowledge database is updated based on the extracted newly appeared element and relational information.

1-3. Example Processing Executed by Information Providing Device

In the following, examples of the selection processing, learning processing, and update processing (hereinafter collectively referred to as "respective processing/each processing") executed by the information providing device 10 will be described with reference to FIG. 1. First, the information providing device 10 executes the selection processing. In the selection processing, the information providing device 10 first acquires description contents created within a (e.g., predetermined) period from the description content server 200 (S1).

For example, in a case where a description content is newly registered regarding a certain matter, the matter described by the description content is to be a newly appeared element with high possibility. Therefore, the information providing device 10 acquires, from the description content server 200, description contents having a time/date when a (e.g., predetermined) period or less has elapsed from registration (e.g., several months).

Subsequently, the information providing device 10 extracts, from a description content: an element to be a candidate for a newly appeared element (hereinafter referred to as "element candidate"); and a piece of relational information indicating a relation between the element candidate and another element (S2). For example, in the example illustrated in FIG. 1, the information providing device 10 acquires a description content "description content #1" in which a description content ID (identifier) to identify the description content is "content ID #1", that is, the description content having a registration time/date of "time/date #1". In this case, the information providing device 10 extracts, as the element candidate, a character string estimated to indicate a topic of the description content, and also to estimate a piece of relational information indicating a relation between the element candidate and another element from the content of the description content. In other words, in a case where description content is newly registered, the information providing device 10 acquires an element candidate from the description content.

The information providing device 10 may also extract an element candidate and a piece of relational information by using various kinds of sentence analysis techniques such as morpheme analysis or semantic estimation. Additionally, a description content may include, for example, information that indicates a topic of the description content and also indicates a relation between a matter to be a topic and another matter (for example, information called "InfoBox"). In a case where such an InfoBox is included in the description content, the information providing device 10 may extract an element candidate and a piece of relational information from the InfoBox.

Also, for example, in a case where an InfoBox is added within a (e.g., predetermined) period (e.g., one month) from registration of the description content, the information providing device 10 may adopt a piece of relational information registered in this InfoBox as a piece of relational information of an element candidate. Additionally, there may be a case where an InfoBox may include classification information indicating classification, such as a category, a class, and the like of an element candidate. In a case where such classification information is included in the InfoBox, the information providing device 10 may extract the classification information of the element candidate from the InfoBox.

As a result of such processing, the information providing device 10 extracts, as a piece of candidate data, a set including the element candidate and the piece of relational information correlated to the element candidate. For example, in a case where the description content #1 includes an element candidate #1, relational information #1-1 indicating a relation between the element candidate #1 and another first element, and relational information #1-2 indicating a relation between the element candidate #1 and a different second element, the information providing device 10 generates, from the description content #1, the candidate data #1 in which the element candidate #1 is correlated to a relational information group #1 (relational information #1-1 and relational information #1-2). The information providing device 10 may have the candidate data #1 include classification information correlated to the element candidate.

Here, a matter in which a description content has been newly registered may include not only the description content on a newly appeared element but also contents other than the description content on the new matter, for example, a description content created by translating, into Japanese, a description content that already exists in a different language. Therefore, the information providing device 10 selects, from among pieces of candidate data, a piece of candidate data of an element candidate having high reliability to be a newly appeared element. More specifically, the information providing device 10 acquires search histories of an element candidate and pieces of posted information (e.g. posted histories) on the element candidate (S3). Then, the information providing device 10 selects an element candidate to be a newly appeared element based on the number of identified search histories and the number of identified pieces of posted information.

For example, the information providing device 10 identifies an element candidate having, at a (e.g., predetermined) time/date, an increased amount of the search histories and an increased amount of the post histories satisfying a (e.g., predetermined) condition, and generates learning data based on the identified element candidate (S4). More specifically, the information providing device 10 selects, from among a plurality of element candidates extracted from description contents, the element candidate having, at the (e.g., predetermined) time/date, the increased amount of the number of search histories exceeding a (e.g., predetermined) threshold value and also having the increased amount of the number of pieces of posted information exceeding a (e.g., predetermined) threshold value.

For example, an aspect in which a new movie is set as a newly appeared element will be considered. In a case where such a new movie is announced, it can be considered that the number of times of searches using a title of the movie as a search query is rapidly increased after the announcement, compared to before the announcement. Also, in the case where such a new movie is announced, it can be considered that the number of pieces of news and the number of pieces of SNS including the title of the new movie rapidly increase after the announcement, compared to before the announcement. Therefore, it can be considered that the number of times of searches and the number of pieces of posted information using the newly appeared element as the search query rapidly increase from a time/date. Also, in the case of such a new movie is announced, a description content will be generated after a period has elapsed from the announcement. Furthermore, in a case where a novel is made into a movie, it can be considered that an element candidate is included in search queries and pieces of posted information before a time/date of announcement of the movie. Additionally, in a case where an increase in search queries including a title of the movie is not synchronized with increase in pieces of posted information including the title of the movie, it can be considered that a character string that is a character string that is the same as the title of the movie, but is a character string indicating a different matter is retrieved or posted.

Therefore, the information providing device 10 sets, as a reference time/date, a registration time/date of a description content from which an element candidate is extracted, and acquires search histories and pieces of posted information for a (e.g., predetermined) period before the reference time/date. For example, the information providing device 10 acquires: search queries which have been input during the past one year before the reference time/date and include an element candidate; and pieces of posted information posted during the past one year before the reference time/date, that is, the pieces of posted information each including the element candidate. Then, the information providing device 10 selects, from among element candidates extracted from the description content, the element candidate having no search history and no posted information before a (e.g., predetermined) time/date, and having the number of search histories exceeding the (e.g., predetermined) threshold value and having the number of pieces of posted information exceeding the (e.g., predetermined) threshold value at the (e.g., predetermined) time/date.

For example, in the example illustrated in FIG. 1, changes in the number of search queries both including the element candidate #1 are plotted with a dotted line for each time/date, and changes in the number of pieces of posted information including the element candidate #1 are plotted with a straight line for each time/date. In the example illustrated in FIG. 1, as illustrated in (A) of FIG. 1, the number of search queries and the number of pieces of posted information are both "0" until a certain time/date, and as illustrated in (B) of FIG. 1, the number of search queries and the number of pieces of posted information are rapidly increased at the certain time/date. Thus, in a case where the number of search queries and the number of pieces of posted information both including the element candidate #1 are changed from "0" to "1" or more at the same time/date, the element candidate #1 is to be a newly appeared element with high possibility. In this case, the information providing device 10 selects the element candidate #1 as a learning target and sets the candidate data #1 of the element candidate #1 as the learning data #1.

Additionally, the information providing device 10 extracts, as learning data from among pieces of posted information each including an element candidate, pieces of posted information posted at a time/date when the number of the pieces of posted information is rapidly increased. For example, in the example illustrated in FIG. 1, the information providing device 10 extracts, from among the pieces of posted information including the element candidate #1, the posted information group #1 posted at the time/date when the number of pieces of the posted information is changed from "0" to "1" or more, and includes the extracted posted information group #1 in the learning data group #1. As a result of the above-described selection processing, the information providing device 10 can acquire, as learning data, an element candidate having high possibility to be a newly appeared element, pieces of relational information each indicating a relation between the element candidate and another candidate, and pieces of posted information including the element candidate.

In the above-described selection processing, in a case where the number of search queries and the number of pieces of posted information are changed from "0" to "1" or more at the same time/date, the pieces of posted information posted on the time/date are extracted as the learning data. Thus, it can be considered that the pieces of posted information posted at the time/date when the number of search queries and the number of pieces of posted information are changed from "0" to "1" or more are pieces of posted information that describe the element candidate as the newly appeared element.

It can be considered that the pieces of posted information that thus describe the element candidate as the newly appeared element include a sentence having a feature indicating that the element candidate is the newly appeared elements. Therefore, in a case of learning a feature of such pieces of posted information, it can be considered that a model to estimate whether a newly appeared element is included in the pieces of posted information can be created.

Additionally, the pieces of posted information that describe the element candidate as the newly appeared element may include a character string of the element candidate that is the newly appeared element. Therefore, in a case of learning a feature of such pieces of posted information, a model to extract, from the pieces of posted information, a character string estimated to be a newly appeared element may be created.

Furthermore, the pieces of posted information that describe the element candidate as the newly appeared element may include a character string that describes the element candidate that is the newly appeared element, that is, a character string indicating a relation between the element candidate that is the newly appeared element and another element. Therefore, in a case of learning a feature of such pieces of posted information, a model to estimate, from the pieces of posted information, pieces of relational information each indicating a relation between the newly appeared element and another element may be created.

Therefore, using learning data generated by the selection processing, the information providing device 10 performs learning for: a determination model to determine whether pieces of posted information include a newly appeared element; an extraction model to extract the newly appeared element from the pieces of posted information; and a relation estimation model to estimate, from the pieces of posted information, pieces of relational information each indicating a relation between the newly appeared element and another element (S5). For example, the information providing device 10 sets a posted information group #1 included in learning data #1 as correct answer data and causes a model to lean a feature included in the correct answer data, thereby generating the determination model to determine whether pieces of posted information is the pieces of posted information indicating a newly appeared element. More specifically, the information providing device 10 performs learning for the determination model: so as to output information indicating that a newly appeared element is included in input pieces of posted information when the posted information group #1 included in the learning data #1 is input; and so as to output information indicating that no newly appeared element is included in an input piece of posted information when the piece of posted information including an element candidate #1 but not included in the posted information group #1 is input.

Additionally, the information providing device 10 sets the element candidate #1 and the posted information group #1 as correct answer data and causes a model to learn a feature included in the correct answer data, thereby generating the extraction model to extract a newly appeared element from the pieces of posted information. More specifically, the information providing device 10 performs learning for the extraction model so as to output information indicating the element candidate #1 when the respective pieces of posted information included in the posted information group #1 are input. In other words, the information providing device 10 performs learning for the extraction model such that output data becomes the element candidate #1 when the posted information group #1 is input data.

Furthermore, the information providing device 10 sets the posted information group #1 and the relational information group #1 as the correct answer data and causes a model to learn a feature included in the correct answer data, thereby generating the relation estimation model to estimate pieces of relational information of a newly appeared element from the pieces of posted information. More specifically, the information providing device 10 performs learning for the relation estimation model so as to estimate the pieces of relational information included in the relational information group #1 when the respective pieces of posted information included in the posted information group #1 are input.

For example, as relation estimation models, the information providing device 10 performs learning for a plurality of models each extracting another element having a (e.g., predetermined) relation with a newly appeared element from pieces of posted information, that is, learning for the plurality of models each extracting another element having a different relation. For example, the information providing device 10 extracts, from each of the pieces of posted information included in the learning data #1, another element having a (e.g., predetermined) relation with the element candidate by using an arbitrary sentence analysis technique.

For example, in a case where a piece of posted information is a description of a new movie, the information providing device 10 extracts a character string of a cast member, a character string of a director, a character string of a film distributor, or the like. Then, for example, the information providing device 10 performs learning for a first relation estimation model so as to extract a character string of a cast member when a piece of posted information is input, and the information providing device 10 performs learning for a second relation estimation model so as to extract a character string of a director when a piece of posted information is input, and the information providing device 10 performs learning for a third relation estimation model so as to extract a character string of a film distributor when a piece of posted information is input.

Here, the information providing device 10 may perform learning for the relation estimation model by using an arbitrary estimation model. For example, the information providing device 10 may perform learning for the relation estimation model based on entities and pieces of relational information which are already registered in the knowledge database. More specifically, utilizing a characteristic that another element that is an element included in a piece of posted information and has a (e.g., predetermined) relation with an element candidate is an entity inside the knowledge database, the information providing device 10 identifies whether such "another element" is a human, and in the case of a human, the information providing device 10 identifies a gender and an occupation of the human from the knowledge database. Additionally, the information providing device 10 may cause the relation estimation model to learn a relation between the identified relational information, the element candidate, and the element. In other words, the information providing device 10 may perform learning for the relation estimation model to estimate the relation between each of the elements included in the piece of posted information and the element candidate.

Then, the information providing device 10 executes update processing by using each of the models. In other words, the information providing device 10 identifies pieces of posted information each including a newly appeared element, extracts a newly appeared element and pieces of relational information from the identified pieces of information, and updates the knowledge database with the extracted newly appeared element and relational information (S6). For example, in a case where there are pieces of new posted information #N1 and new posted information #N2, the information providing device 10 determines whether each piece of the posted information #N1 and the posted information #N2 is a piece of posted information including a newly appeared element (hereinafter referred to as "newly appeared post") by using the determination model. Then, in a case of determining that the piece of posted information #N1 is a newly appeared post, the information providing device 10 extracts a newly appeared element and pieces of relational information from the posted information #N1 by using the extraction model and the relation estimation model.

More specifically, the information providing device 10 extracts the newly appeared element from the posted information #N1 and also extracts another element individually having a (e.g., predetermined) relation with the newly appeared element. Then, the information providing device 10 updates the knowledge database with the extracted newly appeared element and pieces of relational information. For example, the information providing device 10 registers the newly appeared element in the knowledge database and also sets a triple that correlates, to one another, a newly appeared element, an extracted another element, and a piece of relational information indicating a relation between the newly appeared element and another element. For example, in a case where the relation estimation model for which learning to extract a character string of a director is performed extracts the character string of the director from the posted information #N1 when a piece of posted information is input, the information providing device 10 registers information called a triple that correlates, to one another, a newly appeared element extracted by the extraction model, the character string extracted by the relation estimation model (e.g., another element), and the piece of relational information "director" indicating the relation between the elements.

In other words, in the knowledge database updated by the information providing device 10, various kinds of knowledge are systematized by registering information called triples each including two entities and a piece of relational information indicating the relation between these entities. In other words, in the knowledge database, various kinds of knowledge are systematically represented by the triples each including an entity to be a subject (S), an entity to be an object (O), and the piece of relational information to be a predicate (P).

Thus, the information providing device 10 identifies: search histories related to element candidates which are candidates for a new element; and pieces of posted information on the element candidates. Then, based on the number of identified search histories and the number of identified pieces of posted information, the information providing device 10 selects, from among the element candidates, an element candidate to generate learning data to cause a model to learn a feature of information on the new element. Therefore, the information providing device 10 can improve efficiency of adding a newly appeared element by using a model.

1-4. Models

The information providing device 10 may perform learning for the determination model, extraction model, and relation estimation model (hereinafter referred to as "each of models") in an arbitrary form. For example, the information providing device 10 may adopt any model such as a regression model, a bag of words, a support vector machine (SVM), a deep neural network (DNN), conditional random fields (CRF), or a long short-term memory (LSTM).

For example, the determination model for which learning has been performed by the above-described learning processing includes: an input layer to which a piece of posted information on a (e.g., predetermined) element is input; an output layer; a first element belonging to any layer from the input layer to the output layer but being the layer other than the output layer; and a second element having a value calculated on the basis of the first element and a weight of the first element. The determination model causes a computer to function so as to output, from the output layer, a value indicating whether a piece of posted information is a piece of posted information on a new element by performing calculation based on the first element and the weight of the first element for the piece of information input to the input layer while setting, as the first element, each element belonging to each layer other than the output layer.

Additionally, for example, the extraction model for which learning has been performed by the above-described learning processing includes: an input layer to which a piece of posted information on a new element is input; an output layer; a first element belonging to any layer from the input layer to the output layer but being the layer other than the output layer; and a second element having a value calculated on the basis of the first element and a weight of the first element. The extraction model causes a computer to function so as to output, from the output layer, a value representing information indicating the new element out of information included in the piece of posted information by performing calculation based on the first element and the weight of the first element for the piece of information input to the input layer while setting, as the first element, each element belonging to each layer other than the output layer.

Furthermore, for example, the relation estimation model for which learning has been performed by the above-described learning processing includes: an input layer to which a piece of posted information on a new element is input; an output layer; and a first element belonging to any layer from a recording input layer to the output layer but being the layer other than the output layer; and a second element having a value calculated based on the first element and a weight of the first element. The relation estimation model causes a computer to function so as to output, from the output layer, a value indicating a relation between the new element and another element included in a piece of posted information by performing calculation for the information input to the input layer on the basis of the first element and the weight of the first element while setting, as the first layer, each element belonging to each layer other than the output layer.

Here, it is understood that each of the models is implemented by a regression model represented by "$y=a1*x1+a2*x2+\ldots+ai*xi$". In this case, the first element included in each of the models corresponds to input data ($xi$) such as $x1$, $x2$, and the like. Also, the weight of the first element corresponds to a coefficient $ai$ corresponding to $xi$. Here, the regression model can be regarded as a simple perceptron including an input layer and an output layer. When each of the models is regarded as the simple perceptron, the first element corresponds to one of nodes included in the input layer, and the second element can be regarded as a node included in the output layer.

Additionally, it is understood that each of the models is implemented by a neural network such as a deep neural network (DNN) including one or more intermediate layers. In this case, the first element included in each of the models corresponds to one of nodes included in the input layer or the intermediate layer. Also, the second element corresponds to a next-stage node that is a node to which a value is transmitted from the node corresponding to the first element. Additionally, a weight of the first element corresponds to a connection coefficient that is a weight considering a value transmitted from the node corresponding to the first element to the node corresponding to the second element.

The information providing device 10 acquires a newly appeared element and pieces of relational information by using each of the models having arbitrary structures such as the above-described regression model and neural network. Specifically, in the determination model, various kinds of parameters (such as a connection coefficient) are set so as to output a score indicating whether a newly appeared element is included in a piece of posted information in a case where the piece of posted information is input. Additionally, in the extracted model, various kinds of parameters are set so as to output information indicating a piece of information such as a character string having possibility to be a newly appeared element from a piece of posted information in a case where the piece of posted information is input. Furthermore, in the relation estimation model, various kinds of parameters are set so as to output information indicating another element having a (e.g., predetermined) relation with a newly appeared element indicated by a piece of posted information in a case where the piece of posted information is input.

Meanwhile, each of the models according to the example implementation may be a model generated based on a result obtained by repeatedly inputting and outputting data to and from a (e.g., predetermined) model. Also, in a case where the information providing device 10 performs learning processing using generative adversarial networks (GAN), each of the models may be a model constituting a part of the GAN.

For example, the information providing device 10 generates each of the models by performing the above-described learning by using learning data including: an element candidate selected based on the number of search histories related to the element candidate and the number of pieces of posted information on the element candidate from among element candidates that are candidates for a new element; search histories related to the element candidate; and pieces of information each indicating a relation between the element candidate and another element. Note that the information providing device 10 may generate each of the models by using any learning algorithm. For example, the information providing device 10 generates a learning model by using a learning algorithm such as a neural network, a support vector machine, clustering, and reinforcement learning. For example, in a case where the information providing device 10 generates each of the models by using the neural network, each of the models includes an input layer including one or more neurons, an intermediate layer including one or more neurons, and an output layer including one or more neurons.

The learning data is data to actuate the information providing device 10 as the various kinds of models described above. In other words, the learning data is the data in order to cause a computer to function as the various kinds of models described above, and includes: an element candidate selected on the basis of the number of search histories related to the element candidate and the number of pieces of posted information on the element candidate from among element candidates that are candidates for a newly appeared element; search histories related to the element candidate; and pieces of information each indicating a relation between the element candidate and another element.

1-5. Learning Data

In the above description, the information providing device 10 sets, as learning data, pieces of posted information posted at the time/date when the number of search queries and the number of pieces of posted information become from "0" to "1" or more. However, the example implementation is not limited thereto. For example, the information providing device 10 may set, as the learning data, pieces of posted information posted during a day on which the number of search queries and the number of pieces of posted information become from "0" to "1" or more, and also may set, as the learning data, pieces of posted information during a period from a day on which the number of search queries and the number of pieces of posted information become from "0" to "1" or more until a (e.g., predetermined) time/date has elapsed from that day.

Furthermore, for example, in a case where the information providing device 10 selects an element candidate to be the learning data based on a search state indicated by search histories and a post state indicated by post histories, the element candidate can be selected based on an arbitrary state. For example, in a case where a period during which each of the number of search histories and the number of post histories is a (e.g., predetermined) threshold value or less exists a (e.g., predetermined) threshold value or more and each of the number of search histories and the number of post histories becomes the (e.g., predetermined) threshold value or more from a certain day, the information providing device 10 may select, as the learning data, an element candidate corresponding thereto. Additionally, the information providing device 10 may select an element candidate based on an arbitrary state such as statistical states of search and post indicated by search histories and post histories.

Furthermore, the information providing device 10 may generate learning data to be not only a positive example but also a negative example. For example, the information providing device 10 sets, as a positive example, a piece of posted information related to a certain element candidate and posted on a day on which the number of search queries and the number of pieces of posted information become "0" to "1" or more, and sets, as a negative example, a piece of posted information related to the element candidate and posted after a (e.g., predetermined) time/date has elapsed from the day on which the number of search queries and the number of pieces of posted information become "0" to "1" or more. Then, the information providing device 10 may perform learning for the determination model by using the positive example and the negative example.

Meanwhile, the information providing device 10 may acquire pieces of posted information registered during an arbitrary period at the time of creating the each of models. For example, the information providing device 10 may acquire pieces of posted information and search queries during past one year, and may determine whether an element candidate is a newly appeared element by using the acquired pieces of posted information and search queries.

Additionally, a period from generation of a newly appeared element until a description content of the newly appeared element is generated or an InfoBox is generated is estimated to be within a (e.g., predetermined) range (40 days on average, for example). Therefore, the information providing device 10 may acquire pieces of posted information during the period of 40 days from the time/date of generation of the description content or generation of the InfoBox, and may set the acquired pieces of posted information as the learning data.

2. Configuration of Information Providing Device

Figure 2:
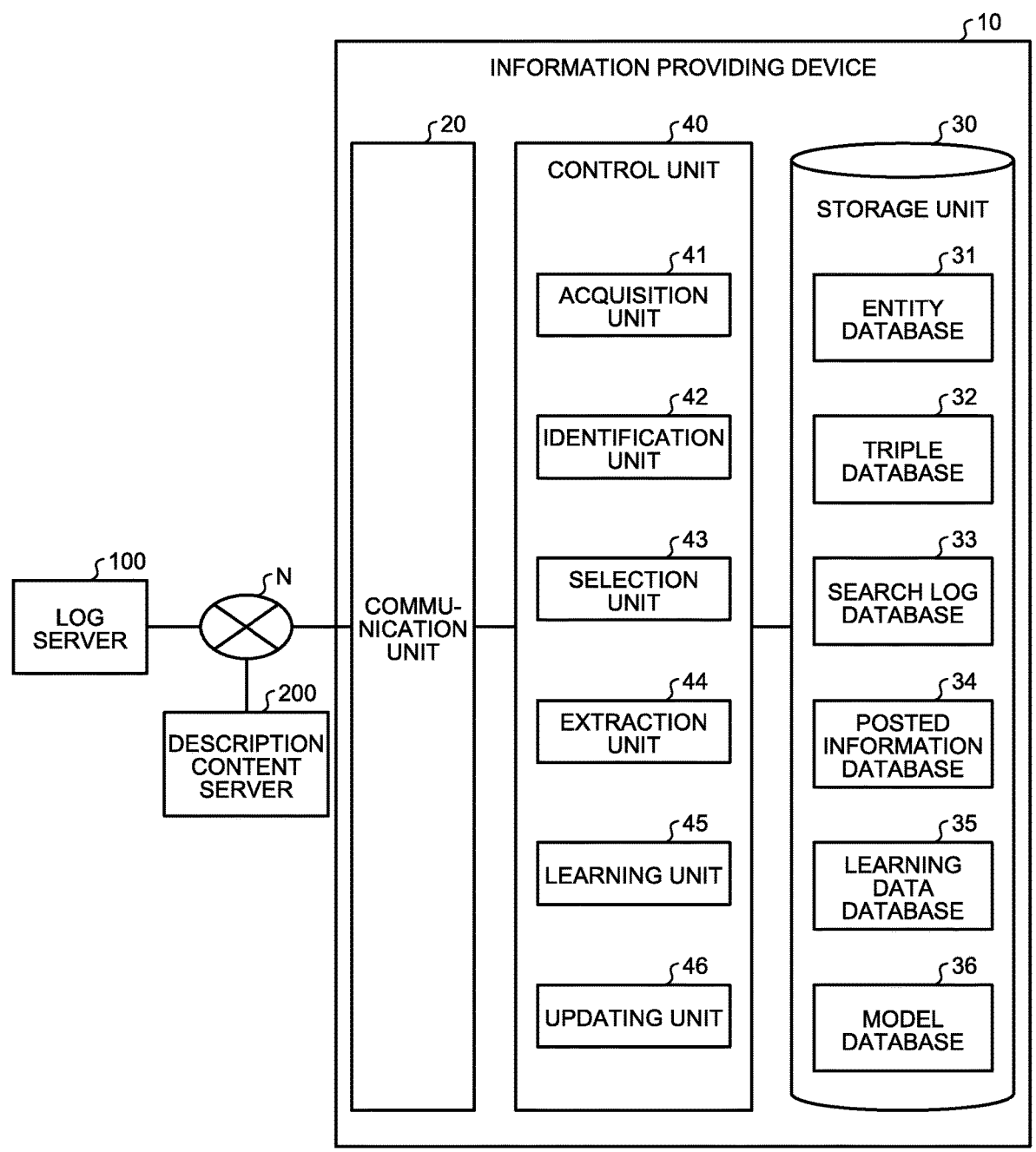
FIG. 2 is a diagram illustrating a configuration of the information providing device according to the example implementation.

In the following, an example functional configuration of the above-described information providing device 10 will be described. FIG. 2 is a diagram illustrating an exemplary configuration of the information providing device according to the example implementation. As illustrated in FIG. 2, the information providing device 10 includes a communication unit 20, a storage unit 30, and a control unit 40.

The communication unit 20 is implemented by, for example, a network interface card (NIC) or the like. The communication unit 20 is connected to a network N in a wired or wireless manner and exchanges information with the log server 100 and the description content server 200.

The storage unit 30 is implemented by, for example, a semiconductor memory element such as a random access memory (RAM) or a flash memory, or a storage device such as a hard disk or an optical disk. Additionally, the storage unit 30 stores an entity database 31, a triple database 32, a search log database 33, a posted information database 34, a learning data database 35, and a model database 36 (hereinafter collectively referred to as "each of databases 31 to 36), each of which may be structurally implemented as a data storage structure (e.g., database or the like).

In the following, exemplary information registered in each of the databases 31 to 36 will be described with reference to FIGS. 3 to 8. In the entity database 31, pieces of information on entities are registered. For example, FIG. 3 is a diagram illustrating exemplary information registered in the entity database according to the example implementation. As illustrated in FIG. 3, pieces of information including items such as "entity ID", "entity type", "node ID", "node type", and "data" are registered in the entity database 31.

Here, the "entity ID" is an identifier for each entity. Additionally, the "entity type" is information indicating an entity type indicated by the correlated "entity ID", and indicates information on, for example, whether the entity is an entity indicating a "person" or an entity indicating an "occupation". The "Node ID" is an identifier for a node related to an entity indicated by the correlated "entity ID". The "node type" is information indicating a node type indicated by the correlated "node ID" and is information on, for example, whether the node indicates a name, a photo, an occupation, or the like. Additionally, the "data" is node data indicated by the correlated "node ID".

For example, in the example illustrated in FIG. 3, an entity ID "E11", an entity type "person", a node ID "I111", a node type "name", and data "name #1" are registered in a correlated manner. Such pieces of information indicate that the entity indicated by the entity ID "E11" (i.e., entity E11) is the entity indicating the "person", the node ID "I111" is registered as a node indicating the "name" of the person indicated by the entity, and the name is "name #1". Meanwhile, in the example illustrated in FIG. 3, conceptual values such as "name #1" and "photo #1" are described; however, various kinds of information indicating a name of a person, a photo, a date of birth, and the like corresponding to the correlated entity are registered in the entity database 31.

In the triple database 32, information indicating each triple is registered. For example, FIG. 4 is a diagram illustrating exemplary information registered in the triple database according to the example implementation. In the example illustrated in FIG. 4, pieces of information including items such as a "triple ID", a "relational information ID", a "type", a "first element", and a "second element" are registered in the triple database 32.

Here, the "triple ID" is an identifier to identify a triple. Additionally, the "relational information ID" is an identifier to identify a piece of relational information included in a triple. Also, the "type" is information indicating a relation between the entities included in a triple. Additionally, the "first element" and the "second element" are entity IDs of entities included in a triple indicated by the correlated "Triple ID".

For example, in the example illustrated in FIG. 4, a triple ID "triple #1", a relational information ID "C1", a type "occupation", a first element "E11", and a second element "E21" are registered in a correlated manner. Such pieces of information indicate that the entity E11, the entity E12, and the relational information C1 are registered in a correlated manner as a triple indicated by the triple ID "triple #1", and the entity E21 is the occupation of the entity E11.

In the search log database 33, search query histories, namely, search histories are registered. For example, FIG. 5 is a diagram illustrating exemplary information registered in the search log database according to the example implementation. As illustrated in FIG. 5, pieces of information including items such as a "search log ID" that is an identifier to identify a search log, a "search query" indicating a search query that has been input, and a "searched time/date" indicating a time/date when a search is made are registered in the search log database 33.

For example, in the example illustrated in FIG. 5, the pieces of information such as a search log ID "search log #1", a search query "search query #1", and a searched time/date "searched time/date #1" are registered in the search log database 33 in a correlated manner. Such pieces of information indicate that the search query of the search log indicated by the search log ID "search log #1" is the "search query #1" and the searched time/date is the "searched time/date #1". Meanwhile, in the example illustrated in FIG. 5, conceptual values such as the "search log #1", "search query #1", and "searched time/date #1" are described; however, a numerical value and a character string to identify each search log, a character string that has been input as each search query, a numerical value indicating each searched time/date, and the like are registered in the search log database 33.

In the posted information database 34, pieces of posted information are registered. For example, FIG. 6 is a diagram illustrating exemplary information registered in the posted information database according to the example implementation. As illustrated in FIG. 6, pieces of information including items such as a "post log ID" that is an identifier to identify each piece of posted information, "posted information" indicating content of each piece of posted information, and a "posted time/date" indicating a time/date of each piece of posted information is posted are registered in the posted information database 34.

For example, in the example illustrated in FIG. 6, pieces of information such as a post log ID "post log #1", a piece of posted information "posted information #1", a posted time/date "posted time/date #1" are registered in the posted information database 34 in a correlated manner. Such pieces of information indicate that the posted information indicated by the post log ID "post log #1" is the "posted information #1" and the posted time/date is the "posted time/date #1". Meanwhile, in the example illustrated in FIG. 6, conceptual values such as the "post log #1", "posted information #1", and "posted time/date #1" are described; however, a numerical value and a character string to identify a piece of posted information, a character string that has been input as a piece of posted information, a numerical value indicating a posted time/date, and the like are registered in the posted information database 34.

Figure 7:
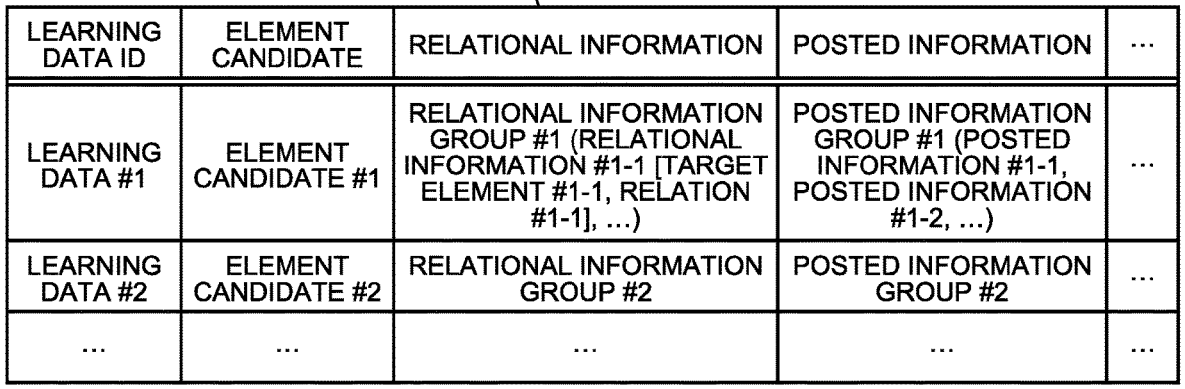
FIG. 7 is a diagram illustrating information registered in a learning data database according to the example implementation.

In the learning data database 35, pieces of learning data are registered. For example, FIG. 7 is a diagram illustrating exemplary information registered in the learning data database according to the example implementation. As illustrated in FIG. 7, registered in the learning data database 35 are pieces of information including items such as a "learning data ID" that is an identifier to identify each piece of learning data, an "element candidate" that is an element candidate included in each piece of learning data, "relational information" corresponding to pieces of relational information included in each piece of learning data, and "posted information" corresponding to pieces of posted information included in each piece of learning data.

For example, in the example illustrated in FIG. 7, a learning data ID "learning data #1", an element candidate "element candidate #1", relational information "relational information group #1", and posted information "posted information group #1" are registered in the learning data database 35 in a correlated manner. Such pieces of information indicate that the learning data ID "learning data #1 is registered as learning data in a manner correlated to the "element candidate #1", "relational information group #1", and "posted information group #1". Additionally, such pieces of information indicate that registered as the "relational information group #1" is a fact that another element having a (e.g., predetermined) relation with the "element candidate #1" is "target element #1-1" and the relation is a "relation #1-1". Additionally, such pieces of information indicate that "posted information #1-1" and "posted information #1-2" are registered as the "posted information group #1".

Meanwhile, in the example illustrated in FIG. 7, conceptual values such as the "learning data #1", "element candidate #1", "relational information #1-1", "relation #1-1", and "posted information #1-1" are described; however, a numerical value and a character string to identify each piece of learning data, character strings to be an element candidate, a piece of relational information, a relation, a piece of posted information, and the like are registered in the learning data database 35.

Figure 8:
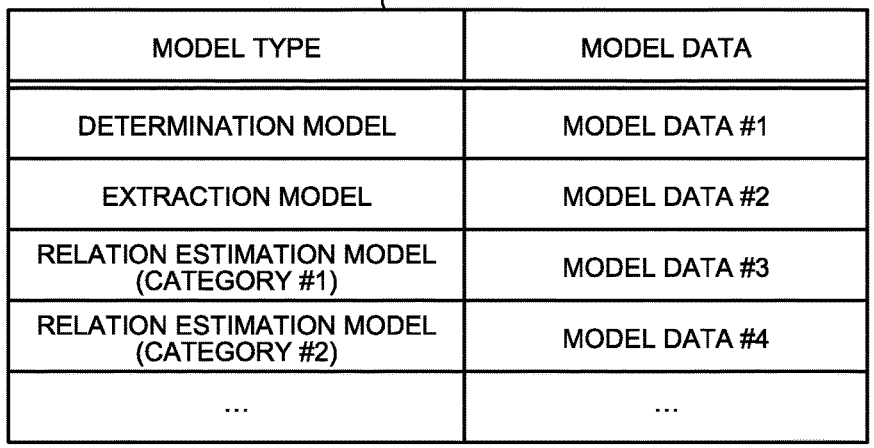
FIG. 8 is a diagram illustrating information registered in a model database according to example implementation.

In the model database 36, pieces of data in each of the models are registered. For example, FIG. 8 is a diagram illustrating exemplary information registered in the model database according to the example implementation. As illustrated in FIG. 8, a "model type" indicating a model type and "model data" indicating a piece of model information are registered in the model database 36 in a correlated manner.

For example, in the example illustrated in FIG. 8, a model type "determination model" and a model data "model data #1" are registered in the model database 36 in a correlated manner. Such pieces of information indicate that various kinds of parameters of the model that is the "determination model" correspond to the "model data #1". Meanwhile, in the example illustrated in FIG. 8, conceptual values such as the "model data #1" is described; however, various kinds of information necessary to construct a model, such as a connection relation between nodes and a connection coefficient, are registered.

Returning back to FIG. 2, the description will be continued. The control unit 40 is a controller and implemented by, for example, a processor such as a central processing unit (CPU) or a micro processing unit (MPU) executing various kinds of programs (e.g., non-transitory computer readable medium including stored instructions executed by a microprocessor) stored in a storage device of the information providing device 10 while using a RAM or the like as a work area. Additionally, the control unit 40 is a controller and may be implemented by, for example, an integrated circuit such as an application specific integrated circuit (ASIC) or a field programmable gate array (FPGA).

As illustrated in FIG. 2, the control unit 40 has one or more functional units, including but not limited to, an acquisition unit 41, an identification unit 42, a selection unit 43, an extraction unit 44, a learning unit 45, and an updating unit 46; these functional units are structurally implemented in the control unit 40.

The structure of the control unit 40 is configured to perform a function of acquiring, hereinafter referred to as an "acquiring unit". More specifically, in a case where a description content describing an element candidate is registered, the acquisition unit 41 acquires an element candidate from the description content. For example, the acquisition unit 41 refers to the description content server 200 at (e.g., predetermined) time intervals, and acquires newly registered description contents within a (e.g., predetermined) period. In this case, the acquisition unit 41 extracts text indicating a matter to a topic of the description content by using various kinds of character analysis techniques, and sets the extracted text as an element candidate.

The structure of the control unit 40 is configured to perform a function of identifying, hereinafter referred to as an "identification unit". More specifically, the identification unit 42 identifies: a search history related to the element candidate that is a candidate for a new element; and a piece of posted information on the element candidate. More specifically, the identification unit 42 identifies: a search history of the element candidate acquired from the description content by the acquisition unit 41; and a piece of posted information on the element candidate. For example, the identification unit 42 identifies a piece of posted information that corresponds to a piece of posted information of the element candidate and is posted within a (e.g., predetermined) period before the description content is registered.

For example, the identification unit 42 acquires various search histories and various pieces of posted information from the log server 100 at (e.g., predetermined) time intervals. Then, the identification unit 42 registers the acquired search histories in the search log database 33, and registers the acquired pieces of posted information in the posted information database 34. Additionally, in a case where an element candidate is acquired by the acquisition unit 41, the identification unit 42 refers to the search log database 33 and identifies a search log including the element candidate as a search query. Furthermore, the identification unit 42 identifies, from the posted information database 34, a piece of posted information including the acquired element candidate.

Here, the identification unit 42 may consider a searched time/date and a posted time/date at the time of identifying a search history and a piece of posted information. For example, the identification unit 42 may identify the time/date when description content of the acquired element candidate is registered, and may identify a search history or a piece of posted information for which searching or posting is made within a (e.g., predetermined) period before the identified time/date from among the search histories and the pieces of posted information. For example, the identification unit 42 may identify pieces of posted information for a period of 40 days before the registration date of the description content.

The structure of the control unit 40 is configured to perform a function of selecting, hereinafter referred to as a "selection unit". More specifically, the selection unit 43 selects, from among element candidates, an element candidate to generate learning data based on identified search histories and identified pieces of posted information in order to cause a model to learn a feature of information on a new element. For example, the selection unit 43 selects, from among a plurality of the element candidates, an element candidate having an increased amount of the number of search histories exceeding a (e.g., predetermined) threshold value, and having an increased amount of the number of pieces of posted information exceeding a (e.g., predetermined) threshold value at a (e.g., predetermined) time/date. For example, the selection unit 43 selects, from among the plurality of element candidates, an element candidate having no search history and no posted information before a (e.g., predetermined) time/date, and having the number of search histories exceeding the (e.g., predetermined) threshold value and having the number of pieces of posted information exceeding the (e.g., predetermined) threshold value at the (e.g., predetermined) time/date.

Figure 9:
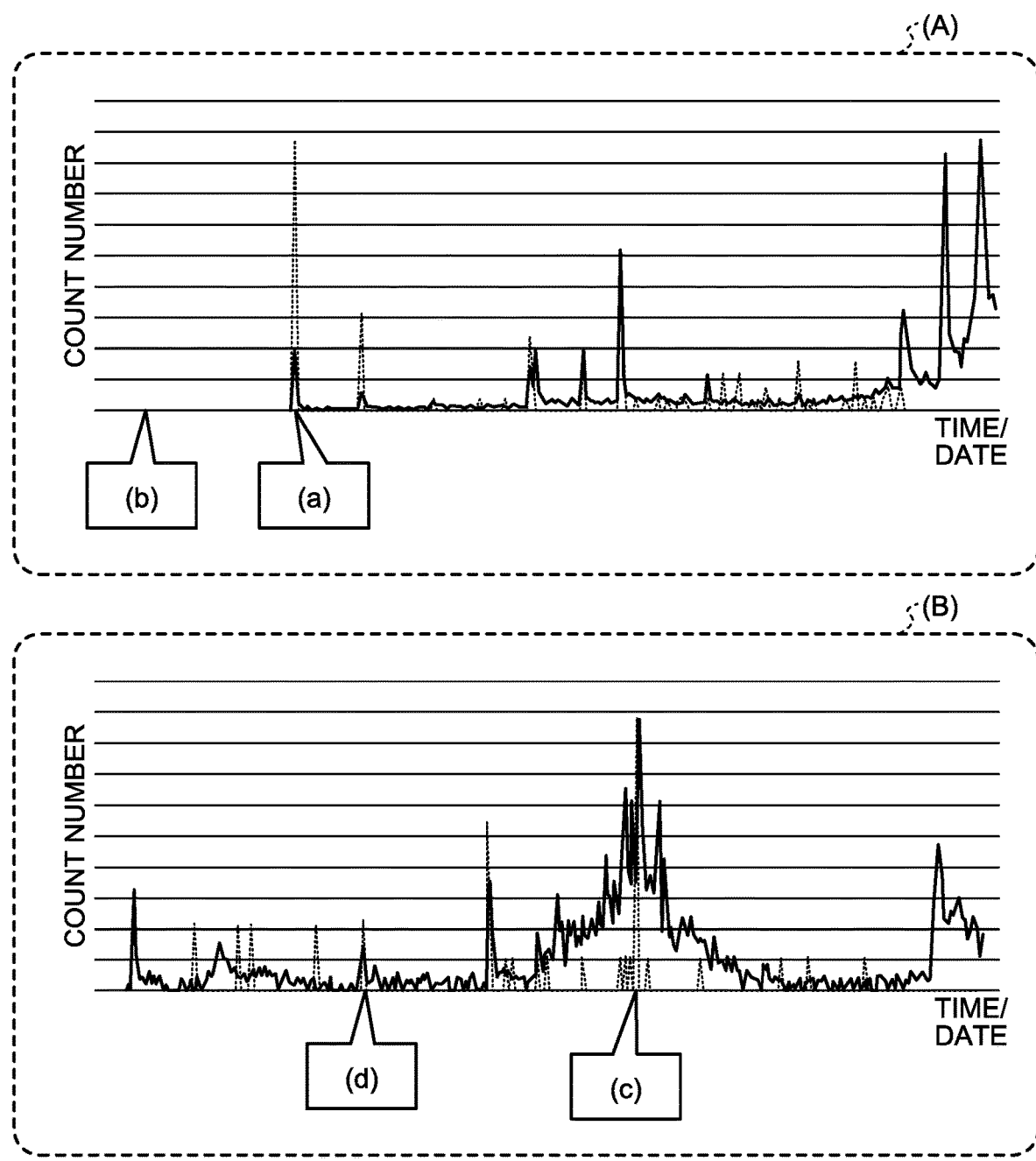
FIG. 9 provides diagrams illustrating processing in which the information providing device according to the example implementation selects an element candidate to be a creation target of learning data.

For example, FIG. 9 provides diagrams illustrating exemplary processing in which the information providing device according to the example implementation selects an element candidate to be a creation target of learning data. In (A) of FIG. 9, changes in the number of search queries including an element candidate #1 are plotted with a dotted line for each time/date, and changes in the number of pieces of posted information including the element candidate #1 are plotted with a straight line for each time/date. Additionally, in (B) of FIG. 9, changes in the number of search queries including an element candidate #2 are plotted with a dotted line for each time/date, and changes in the number of pieces of posted information including the element candidate #2 are plotted with a straight line for each time/date.

For example, search histories or pieces of posted information including the element candidate #1 suddenly start to appear at the time/date indicated by (a) of FIG. 9, and there is no search history and no posted information including the element candidate #1 during a period indicated by (b) of FIG. 9 before (a) of FIG. 9. In a case where the number of search histories and the number of pieces of posted information exhibit changes, the element candidate #1 is to be a newly appeared element with high possibility. Therefore, the selection unit 43 selects, as a creation target of learning data, the element candidate #1 changed from the state in which there is no search history and no posted information to the state in which the number of search histories exceeds the (e.g., predetermined) threshold value and the number of pieces of posted information exceeds the (e.g., predetermined) threshold value at the (e.g., predetermined) time/date.

On the other hand, as illustrated in (B) of FIG. 9, the number of search histories and the number of pieces of posted information both including an element candidate #2 have amounts although increase and decrease are repeated. Here, the number of search histories and the number of pieces of posted information both including the element candidate #2 are rapidly increased at a time/date indicated by (c) of FIG. 9, but there is other times and dates when the number of search histories and the number of pieces of posted information both including the element candidate #2 are also rapidly increased in the past indicated by (d) of FIG. 9. In a case where the number of search histories and the number of pieces of posted information exhibit the above-described changes, the element candidate #2 is not a newly appeared element with high possibility. More specifically, in a case where the element candidate #2 is a title of a novel, it can be considered that the element candidate #2 becomes a news-worthy topic at the time/date indicated by (d) of FIG. 9, and the novel of the element candidate #2 is made into a movie at the time/date indicated by (c) of FIG. 9. In a case of setting such an element candidate #2 as learning data, a piece of posted information really including a newly appeared element cannot be selected, and reliability of detecting a newly appeared element may be degraded as a result of degraded extraction accuracy of the learning data. Therefore, the information providing device 10 excludes the element candidate #2 from the creation target to generate the learning data.

Returning back to FIG. 2, the description will be continued. The structure of the control unit 40 is configured to perform a function of extracting, hereinafter referred to as an "extraction unit". More specifically, the extraction unit 44 extracts, as learning data, pieces of posted information posted at a time/date when the number of pieces of posted information or the number of pieces of search information (search query) are rapidly increased from among pieces of posted information on an element candidate selected by the selection unit 43. Additionally, the extraction unit 44 extracts, as the learning data, a relation between the element candidate and another element from a description content describing the element candidate. For example, in a case where the selection unit 43 selects an element candidate to be a creation target of the learning data, the extraction unit 44 extracts pieces of posted information which are pieces of posted information including the selected element candidate and posted on a day on which the number of pieces of posted information and the number of pieces of search information are increased from "0" to "1". Then, the extraction unit 44 registers the element candidate and the extracted pieces of posted information in the learning data database 35 in a correlated manner.

Additionally, in a case where an InfoBox is registered in the description content of the element candidate, the extraction unit 44 extracts a piece of relational information indicating a relation between the element candidate and another element from the InfoBox. Meanwhile, the extraction unit 44 may also identify a piece of relational information indicating a relation between the element candidate and another element from, for example, a character analysis technique, a link relation to another description content set in the description content, or the like. Then, the extraction unit 44 registers the extracted piece of relational information in the learning data database 35 in a manner correlated to the element candidate.

The structure of the control unit 40 is configured to perform a function of learning, hereinafter referred to as a "learning unit". More specifically, the learning unit 45 causes a model to learn a feature of information on a new element by using information on the selected element candidate. In other words, the learning unit 45 performs learning for each of the models by using the learning data on the element candidate selected by the selection unit 43. For example, the learning unit 45 causes each of the models to learn various kinds of features included in the learning data by using, as the learning data, the selected element candidate, pieces of posted information on the element candidate, and each of relations between the element candidate and another element.

For example, the learning unit 45 performs learning for the determination model to determine whether a posted information is a post related to a new element by using pieces of posted information of the learning data. For example, when a piece of posted information included in the learning data is input, the learning unit 45 outputs information indicating that a newly appeared element is included in this input piece of posted information, and when another piece of posted information is input, the learning unit 45 performs learning for the determination model so as to output information indicating that no newly appeared element is included in the input piece of posted information.

Furthermore, for example, the learning unit 45 performs learning for the element extraction model to extract a new element included in a piece of posted information by using an element candidate and pieces of posted information on the element candidate of learning data. For example, when a piece of posted information of certain learning data is input, the learning unit 45 performs learning for the extraction model so as to output information indicating an element candidate of the learning data.

Additionally, for example, the learning unit 45 performs learning for a relation estimation model to extract a relation between a new element and another element included in a piece of posted information by using pieces of posted information of the learning data and a relation between the element candidate and another element of the learning data. More specifically, the learning unit 45 performs learning for a plurality of models each extracting another element having a (e.g., predetermined) relation with a new element from a piece of posted information, that is, learning for the plurality of models each extracting another element having a different relation.

For example, the learning unit 45 prepares, as relation estimation models, a plurality of models correlated to different relations. Additionally, for example, in a case of performing learning for a model correlated to a first relation, the learning unit 45 refers to the learning data database 35 and identifies an element candidate and another element having the first relation with the element candidate. Then, when a piece of posted information is input to the model correlated to the first relation, the learning unit 45 performs learning for the model so as to output information indicating another element that has been identified. By executing such processing for each relation estimation model, the learning unit 45 can perform learning for a model to extract, from pieces of posted information, another element having the (e.g., predetermined) relation with the element candidate, that is, learning for the relation estimation model in order to estimate a relation between the element candidate and another element.

The structure of the control unit 40 is configured to perform a function of updating, hereinafter referred to as an "updating unit". More specifically, the updating unit 46 updates the knowledge database by using each of the models for which learning has been performed by the learning unit 45. For example, the updating unit 46 acquires, from the log server 100, pieces of posted information that have been posted within a (e.g., predetermined) time. Then, the updating unit 46 determines whether each of the pieces of posted information includes a newly appeared element by using the determination model.

Additionally, in a case where the determination model determines that a newly appeared element is included in a certain piece of posted information, the updating unit 46 extracts the newly appeared element from the piece of posted information by using the extraction model. In other words, the updating unit 46 extracts, by using the extraction model, a character string having high possibility to indicate the newly appeared element from the piece of posted information determined to include the newly appeared element. Additionally, the updating unit 46 extracts, by using a relation estimation model, another element estimated to have a (e.g., predetermined) relation with the newly appeared element from the piece of posted information determined to include the newly appeared element.

Then, the updating unit 46 updates the knowledge database with the extracted newly appeared element and the relation between the newly appeared element and another element. For example, the updating unit 46 registers an entity indicating the newly appeared element in the entity database 31. Additionally, the updating unit 46 identifies, from the entity database 31, an entity of another element having the (e.g., predetermined) relation with the newly appeared element. Then the updating unit 46 registers, as a triple, a set including the entity of the newly appeared element, the identified entity of another element, and the relation correlated to the relation estimation model that has extracted the element (namely, "type") in the triple database 32.

3. Example Flow of Processing Executed by Information Providing Device

Figure 10:
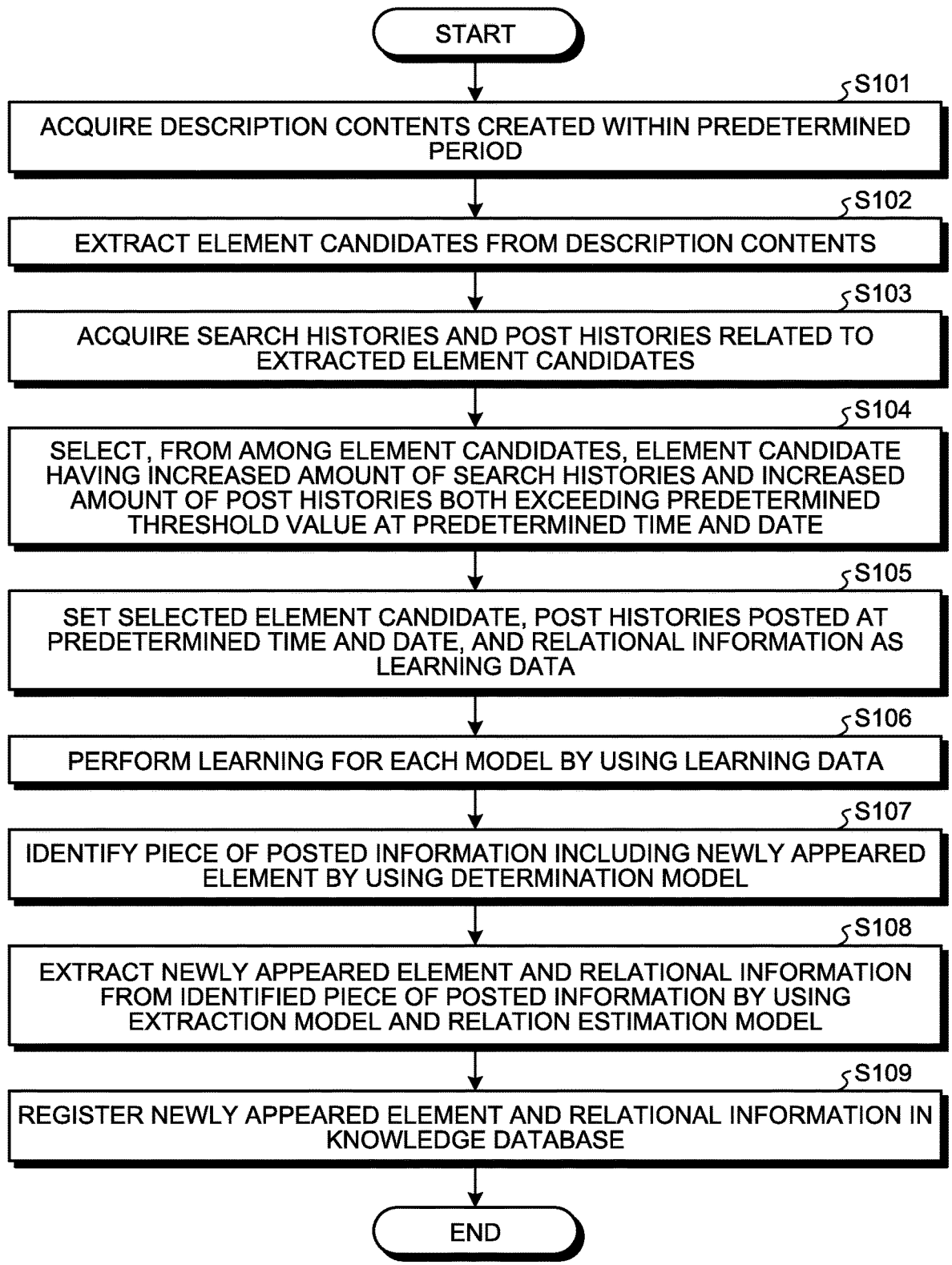
FIG. 10 is a flowchart illustrating a flow of processing executed by the information providing device according to the example implementation.

Next, a flow of processing executed by the information providing device 10 will be described with reference to FIG. 10. FIG. 10 is a flowchart illustrating exemplary flow of the processing executed by the information providing device according to the example implementation.

First, the information providing device 10 acquires description contents created within a (e.g., predetermined) period (S101). Subsequently, the information providing device 10 extracts element candidates from the description contents (S102). Also, the information providing device 10 acquires search histories and post histories related to the extracted element candidates (S103). Then, the information providing device 10 selects, from among the element candidates, an element candidate having an increased amount of the search histories exceeding a (e.g., predetermined) threshold value and having an increased amount of the post histories exceeding a (e.g., predetermined) threshold value at a (e.g., predetermined) time/date (S104).

Additionally, the information providing device 10 sets, as learning data, the selected element candidate, post histories posted at the (e.g., predetermined) time/date, and pieces of relational information (S105). Then, the information providing device 10 performs learning for each model by using the learning data (S106). Additionally, the information providing device 10 identifies a piece of posted information including a newly appeared element by using a determination model (S107), and extracts the newly appeared element and a piece of relational information from the identified piece of posted information by using an extraction model and a relation estimation model (S108). Then, the information providing device 10 registers the newly appeared element and the piece of relational information in the knowledge database (S109), and finishes the processing.

4. Modified Example

In the above description, exemplary selection processing, learning processing, and updating processing by the information providing device 10 are described. However, the example implementation is not limited thereto. In the following, variations of providing processing and selection processing executed by the information providing device 10 will be described.

4-1. Types of Entity

In the above exemplary knowledge database, described is the knowledge database in which a triple that correlates a person to an occupation of the person is registered. However, the example implementation is not limited thereto. In other words, the information providing device 10 may update the knowledge database indicating an arbitrary matter. More specifically, the information providing device 10 may select an arbitrary matter as a newly appeared element and generate learning data, and may extract an arbitrary matter as the newly appeared element.

4-2. Configuration of Device

The information providing device 10 does not necessarily manage the knowledge database on its own. For example, each of the databases 31 to 36 registered in the storage unit 30 may be held in an external storage server. Also, the information providing device 10 may be implemented by a front-end server that implements search processing and a back-end server that implements selection processing. In this case, the respective units 41 to 46 illustrated in FIG. 2 are arranged in the back-end server, and a functional configuration to exert a function to search the knowledge database is arranged in the front-end server.

4-3. Others

Additionally, among the respective processing described in the above example implementation, all or a part of the processing described to be automatically performed can be manually performed, and on the contrary, all or a part of the processing described to be manually performed can be automatically performed. Additionally, the processing procedures, specific names, and pieces of information including various kinds of data and parameters described in the above description and in the drawing can be optionally changed unless otherwise particularly specified. For example, the various kinds of information illustrated in the respective drawings are not limited to the kinds of information illustrated.

Additionally, the respective constituent elements in the respective devices illustrated in the drawings are functionally conceptual and are not required to have physical configurations as illustrated. In other words, specific modes of distribution/integration of the respective devices are not limited to those illustrated, and all or a part thereof can be physically distributed/integrated in an arbitrary unit depending on various kinds of loads and use conditions.

Additionally, the above-described respective example implementations can be suitably combined within a range not inconsistent with the processing content.

4-4. Program (e.g., Non-Transitory Computer Readable Medium Including Stored Instructions Executed by a Microprocessor)

Figure 11:
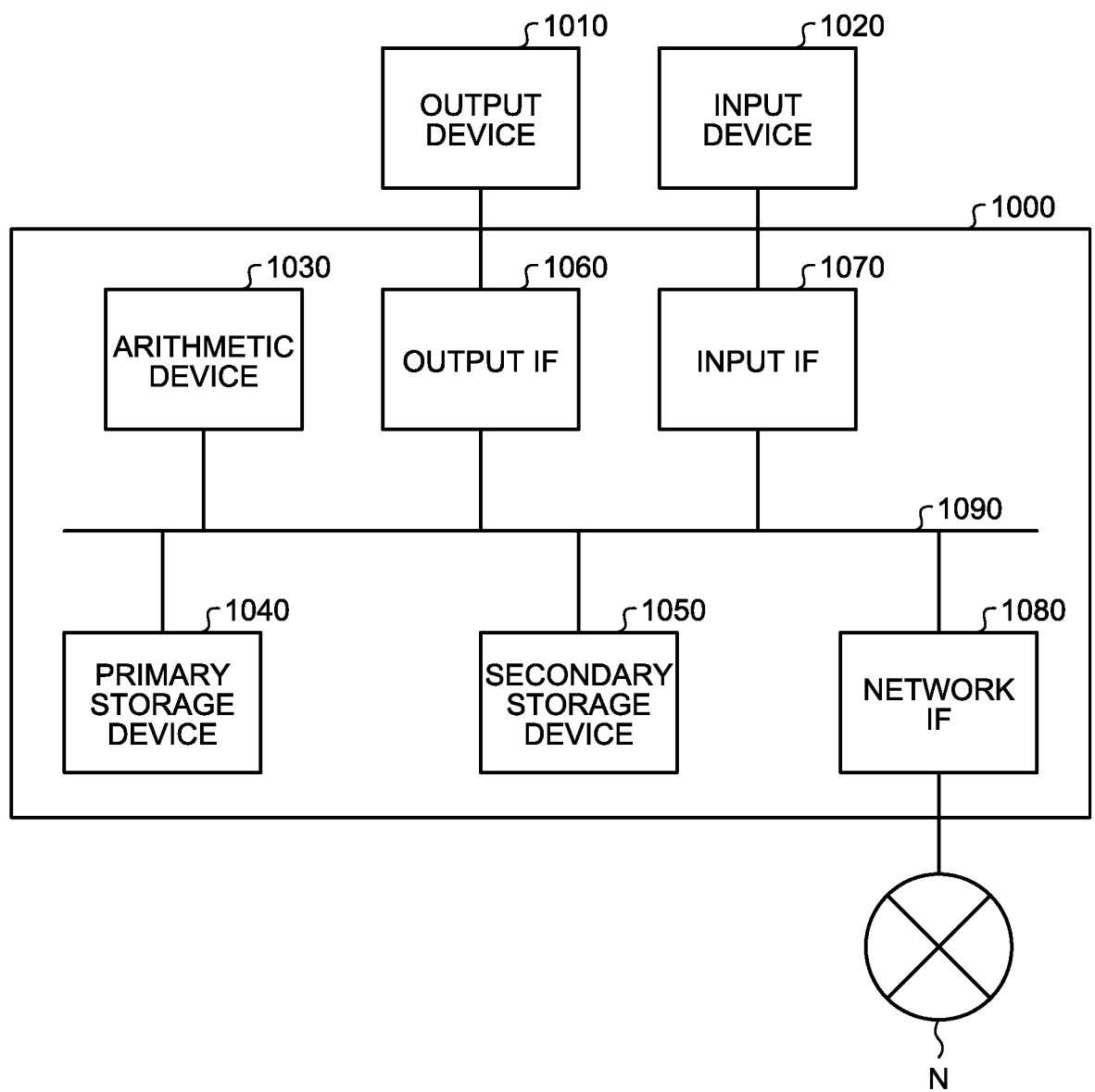
FIG. 11 is a diagram illustrating a hardware configuration, according to the example implementation.

Furthermore, the information providing device 10 according to the above-described example implementation is implemented by a computer 1000 having a configuration as illustrated in FIG. 11, for example. FIG. 11 is a diagram illustrating an exemplary hardware configuration. The computer 1000 is connected to an output device 1010 and an input device 1020, and has mode in which an arithmetic device 1030, a primary storage device 1040, a secondary storage device 1050, an output interface (IF) 1060, an input IF 1070, and a network IF 1080 are connected by a bus 1090.

The arithmetic device 1030 is operated based on, for example, programs (e.g., non-transitory computer readable medium including stored instructions executed by a microprocessor) stored in the primary storage device 1040 and the secondary storage device 1050 and a program read from the input device 1020, and execute various kinds of processing. The primary storage device 1040 is a memory device, such as a RAM, which temporarily stores data used for various kinds of calculations by the arithmetic device 1030. Furthermore, the secondary storage device 1050 is a storage device to register data used for various kinds of calculations by the arithmetic device 1030 and various kinds of databases, and is implemented by a read only memory (ROM), a hard disk drive (HDD), a flash memory, or the like.

The output IF 1060 is an interface to transmit information to be an output target to the output device 1010 such as a monitor and a printer to output various kinds of information, and is implemented by, for example, a connector such as a universal serial bus (USB), a digital visual interface (DVI), or a high definition multimedia interface (HDMI, registered trademark). Additionally, the input IF 1070 is an interface to receive information from various kinds of input devices 1020 such as a mouse, a keyboard, a scanner, and the like, and is implemented by, for example, a USB or the like.

Meanwhile, the input device 1020 may be an optical recording medium such as a compact disc (CD), a digital versatile disc (DVD), or a phase change rewritable disk (PD), a magneto-optical recording medium such as a magneto-optical disk (MO), a tape medium, a magnetic recording medium, or a device to read information from a semiconductor memory or the like. Additionally, the input device 1020 may be an external storage medium such as a USB memory.

The network IF 1080 receives data from another device via a network N, transmits the data to the arithmetic device 1030, and further transmits data generated by the arithmetic device 1030 to another device via the network N.

The arithmetic device 1030 controls the output device 1010 and the input device 1020 via the output IF 1060 and the input IF 1070. For example, the arithmetic device 1030 loads a program (e.g., non-transitory computer readable medium including stored instructions executed by a microprocessor) from the input device 1020 or the secondary storage device 1050 onto the primary storage device 1040, and executes the loaded program.

For example, in a case where the computer 1000 functions as the information providing device 10, the arithmetic device 1030 of the computer 1000 implements the function of the control unit 40 by executing the program loaded onto the primary storage device 1040.

5. Effects

As described above, the information providing device 10 identifies search histories related to element candidates that are candidates for a new element, and pieces of posted information on the element candidates. Then, based on the identified search histories and the identified pieces of posted information, the information providing device 10 selects, from among element candidates, an element candidate in order to generate learning data to cause a model to learn a feature of information related to the new element. As a result, the information providing device 10 can cause the model to learn a feature of the information on the newly appeared element, and consequently, the newly appeared element can be extracted by using the model and the newly appeared entity can be efficiently added.

For example, the information providing device 10 selects an element candidate in order to generate learning data based on a search state indicated by search histories and a post state indicated by pieces of posted information. Additionally, for example, the information providing device 10 selects an element candidate in order to generate learning data based on the number of searches indicated by the search histories and the number of posts indicated by the pieces of the posted information. Therefore, the information providing device 10 can select an element candidate having high possibility to be a newly appeared element as an element candidate to generate learning data.

Additionally, in a case where a description content describing an element candidate is registered, the information providing device 10 acquires the element candidate from the description content. Then, the information providing device 10 identifies a search history of the element candidate and a piece of posted information on the element candidate. For example, the information providing device 10 identifies pieces of posted information corresponding to pieces of posted information of the element candidate and posted within a (e.g., predetermined) period before the description content is registered. Therefore, since the information providing device 10 selects a generation target of learning data from among element candidates each having high possibility to be a newly appeared element, reliability of the learning data can be improved.

Furthermore, the information providing device 10 selects, from among a plurality of element candidates, an element candidate having an increased amount of the number of search histories exceeding a (e.g., predetermined) threshold value and having an increased amount of the number of pieces of posted information exceeding a (e.g., predetermined) threshold value at a (e.g., predetermined) time/date. For example, the information providing device 10 selects, from among the plurality of element candidates, an element candidate having no search history and no posted information before a (e.g., predetermined) time/date, and having the number of search histories exceeding a (e.g., predetermined) threshold and having the number of pieces of posted information exceeding a (e.g., predetermined) threshold value at the (e.g., predetermined) time/date. Therefore, the information providing device 10 can improve reliability of the learning data.

Additionally, the information providing device 10 extracts, as learning data, pieces of posted information posted at a (e.g., predetermined) time/date from among pieces of posted information on a selected element candidate. Additionally, the information providing device 10 extracts, as the learning data, a relation between the element candidate and another element from a description content describing the selected element candidate. Therefore, the information providing device 10 can generate the learning data to implement learning for a model in order to detect a newly appeared element.

Furthermore, the information providing device 10 causes a model to learn a feature of information on a new element by using information on a selected element candidate. For example, the information providing device 10 causes the model to learn, as learning data, an element candidate, a piece of posted information on the element candidate, and a relation between the element candidate and another element. For example, the information providing device 10 performs learning for a determination model to determine whether a piece of posted information is a post related to a new element by using pieces of posted information on the selected element candidate. Additionally, for example, the information providing device 10 performs learning for an element extraction model to extract a new element included in a piece of posted information by using the selected element candidate and pieces of posted information on the element candidate. Additionally, for example, the information providing device 10 performs learning for a relation estimation model to extract a relation between a new element and another element included in a piece of posted information by using the piece of posted information on an element candidate and a relation between the element candidate and another element. More specifically, as relation estimation models, the information providing device 10 performs learning for a plurality of models to extract, from a piece of posted information, another element having a (e.g., predetermined) relation with a new element, that is, learning for the plurality of models each extracting another element having a different relation.

As a result of such processing, the information providing device 10 can detect a newly appeared element with high accuracy and also can estimate the relation between the newly appeared element and another element from various kinds of posted information. As a result, the information providing device 10 can automatically update a triple included in a knowledge database, for example.

While some example implementations of the present application are described in detail with reference to the drawings, the example implementations are examples and the example implementations can be implemented by other example implementations subject to various modifications and improvements on the basis of not only the aspects described in the disclosure but also knowledge of a man skilled in the art.

Additionally, the above-described "section, module, and unit" can be replaced with "means" or "circuit". For example, an specific unit can be replaced with a specifying unit or a specific circuit.

According to one aspect of the example implementation, a newly appeared entity can be more efficiently added.

Although the inventive concept has been described with respect to specific example implementations for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selection device, comprising:
at least one processor configured to execute a program stored in at least one memory to:
  extract a plurality of element candidates and relational information from description contents posted on Internet, wherein each of the plurality of element candidates is a candidate for a new element newly registered to a knowledge database, wherein relational information comprises information extracted from the description contents indicating a relation between ones of the plurality of element candidates and ones of elements registered to the knowledge database;
  identify Internet search histories related to each of the plurality of element candidates, and identify pieces of information posted on the Internet including the plurality of element candidates;
  select, from among the plurality of element candidates, an element candidate based on the identified search histories and the identified pieces of information;
  select, from among the plurality of element candidates, the element candidate having no search history and no posted information before a time/date, and having a number of the search histories exceeding a first threshold value and having a number of the pieces of posted information exceeding a second threshold value at the time/date, and wherein the at least one processor is configured to execute the program to exclude, from among the plurality of element candidates, the element candidate having a search history and/or posted information before the time/date, and having the number of the search histories exceeding the first threshold value and having the number of the pieces of posted information exceeding the second threshold value at the time/date;
  generate learning data from the selected element candidate, the identified pieces of information including the selected element candidate, and the relational information of the selected element candidate extracted from the identified pieces of information related to the selected element candidate;
  using the generated learning data, generate a model configured to identify whether an input piece of information posted to the Internet includes the new element based on the identified Internet search histories related to the selected element candidate and the identified pieces of information related to the selected element candidate, extract the new element, and determine relational information between the new element and another element in the knowledge database from the input piece of information; and
  using the model, identify one or more pieces of information, posted to the Internet, that includes the new element, extract the new element and relational information from the one or more pieces of information, and update the knowledge database with the extracted new element and relational information.

2. The selection device according to claim 1,
wherein the at least one processor is configured to execute the program to select the element candidate to generate the learning data based on a search state indicated by the Internet search histories and a post state indicated by the pieces of information posted to the Internet.

3. The selection device according to claim 1,
wherein the at least one processor is configured to execute the program to select the element candidate to generate the learning data based on a number of searches indicated by the Internet search histories and a number of posts indicated by the pieces of information posted to the Internet.

4. The selection device according to claim 1, the at least one processor is further configured to execute the program to,
acquire an element candidate from the description contents for the description contents describing that the element candidate is registered, and
identify an Internet search history of the acquired element candidate and a piece of information posted to the Internet on the acquired element candidate.

5. The selection device according to claim 4,
wherein the at least one processor is configured to execute the program to identify pieces of information posted to the Internet corresponding to pieces of posted information on an acquired element candidate and posted within a period before the description contents is registered on the knowledge database.

6. The selection device according to claim 1,
wherein the at least one processor is configured to execute the program to select, from among the plurality of element candidates, the element candidate having an increased amount of a number of the search histories exceeding a first threshold value and having an increased amount of a number of the pieces of posted information exceeding a second threshold value at a time/date.

7. The selection device according to claim 6, the at least one processor is further configured to execute the program to,
extract, as the learning data, a piece of information posted to the Internet at the time/date from among the identified pieces of information related to the selected element candidate.

8. The selection device according to claim 7,
wherein the at least one processor is configured to execute the program to extract, as the learning data, the relational information comprising a relation between the selected element candidate and another element from the description contents.

9. The selection device according to claim 1, the at least one processor is further configured to execute the program to,
cause the model to learn to extract the new element by using information on the selected element candidate.

10. The selection device according to claim 9,
wherein the at least one processor is configured to execute the program to cause the model to learn, as the learning data, the selected element candidate, a piece of information posted to the Internet on the selected element candidate, and a relation between the selected element candidate and another element.

11. The selection device according to claim 9,
wherein the at least one processor is configured to execute the program to generate a determination model configured to determine whether the new element is included in the input piece of information by using a piece of the identified pieces of information related to the selected element candidate.

12. The selection device according to claim 9,
wherein the at least one processor is configured to execute the program to generate an element extraction model configured to extract the new element included in the input piece of information by using the selected element candidate and a piece of the identified pieces of posted information related to the selected element candidate.

13. The selection device according to claim 9,
wherein the at least one processor is configured to execute the program to generate a relation estimation model configured to extract a relation between the new element and another element included in a piece of information by using a piece the identified pieces of information related to the selected element candidate and a relation between the selected element candidate and the another element.

14. The selection device according to claim 13,
wherein, as the relation estimation model, the at least one processor is configured to execute the program to perform learning for a plurality of models to extract another element having a relation with the new element from a piece of information posted to the Internet.

15. A selection method executed by a selection device, the method comprising:
extracting a plurality of element candidates and relational information from description contents posted on Internet, wherein each of the plurality of element candidates is a candidate for a new element newly registered to a knowledge database, wherein relational information comprises information extracted from the description content contents indicating a relation between ones of the plurality of element candidates and ones of elements registered to the knowledge database;
identifying Internet search histories related to each of the plurality of element candidates, and identifying pieces of information posted on the Internet including the plurality of element candidates; and
selecting, from among the plurality of element candidates, an element candidate based on the identified search histories and the identified pieces of information;
selecting, from among the plurality of element candidates, the element candidate having no search history and no posted information before a time/date, and having a number of the search histories exceeding a first threshold value and having a number of the pieces of posted information exceeding a second threshold value at the time/date, and excluding, from among the plurality of element candidates, the element candidate having a search history and/or posted information before the time/date, and having the number of the search histories exceeding the first threshold value and having the number of the pieces of posted information exceeding the second threshold value at the time/date;
generating learning data from the selected element candidate, the identified pieces of information including the selected element candidate, and the relational information of the selected element candidate extracted from the identified pieces of information related to the selected element candidate;
generating a model, using the generated learning data, configured to identify whether an input piece information posted to the Internet includes the new element based on the identified Internet search histories related to the selected element candidate and the identified pieces of information related to the selected element candidate, extract the new element, and determine relational information between the new element and another element in the knowledge database from the input piece of information; and identifying, using the model, one or more pieces of information, posted to the Internet, that includes the new element, extracting the new element and relational information from the one or more pieces of information, and updating the knowledge database with the extracted new element and relational information.

16. A non-transitory computer-readable storage medium having stored therein instructions that cause a computer to execute a process, the instructions comprising:

extracting a plurality of element candidates and relational information from description contents posted on Internet, wherein each of the plurality of element candidates is a candidate for a new element newly registered to a knowledge database, wherein relational information comprises information extracted from the description content contents indicating a relation between ones of the plurality of element candidates and ones of elements registered to the knowledge database;

identifying Internet search histories related to each of the plurality of element candidates, and identifying pieces of information posted on the Internet including the plurality of element candidates; and selecting, from among the plurality of element candidates, an element candidate based on the identified search histories and the identified pieces of information;

selecting, from among the plurality of element candidates, the element candidate having no search history and no posted information before a time/date, and having a number of the search histories exceeding a first threshold value and having a number of the pieces of posted information exceeding a second threshold value at the time/date, and excluding, from among the plurality of element candidates, the element candidate having a search history and/or posted information before the time/date, and having the number of the search histories exceeding the first threshold value and having the number of the pieces of posted information exceeding the second threshold value at the time/date;

generating learning data from the selected element candidate, the identified pieces of information including the selected element candidate, and the relational information of the selected element candidate extracted from the identified pieces of information related to the selected element candidate;

generating a model, using the generated learning data, configured to identify whether an input piece information posted to the Internet includes the new element based on the identified Internet search histories related to the selected element candidate and the identified pieces of information related to the selected element candidate, extract the new element, and determine relational information between the new element and another element in the knowledge database from the input piece of information; and identifying, using the model, one or more pieces of information, posted to the Internet, that includes the new element, extracting the new element and relational information from the one or more pieces of information, and updating the knowledge database with the extracted new element and relational information.

* * * * *